(12) United States Patent
Garnier

(10) Patent No.: US 8,511,900 B2
(45) Date of Patent: Aug. 20, 2013

(54) SLIDING BEARING SHELL

(75) Inventor: Thierry Garnier, Nierstein (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 13/635,967

(22) PCT Filed: Mar. 21, 2011

(86) PCT No.: PCT/EP2011/054194
§ 371 (c)(1),
(2), (4) Date: Sep. 19, 2012

(87) PCT Pub. No.: WO2011/113952
PCT Pub. Date: Sep. 22, 2011

(65) Prior Publication Data
US 2013/0016934 A1    Jan. 17, 2013

(30) Foreign Application Priority Data
Mar. 19, 2010  (DE) .......................... 10 2010 003 077

(51) Int. Cl.
*F16C 33/10* (2006.01)
(52) U.S. Cl.
USPC .......................................... 384/288; 384/291
(58) Field of Classification Search
USPC .......................................... 384/286, 288, 291
See application file for complete search history.

(56) References Cited

U.S. PATENT DOCUMENTS

| 6,176,621 B1 * | 1/2001 | Naitoh et al. | 384/291 |
| 8,408,799 B2 * | 4/2013 | Ishigo et al. | 384/288 |
| 2010/0316313 A1 * | 12/2010 | Ishigo et al. | 384/288 |

FOREIGN PATENT DOCUMENTS

| DE | 2537046 A1 | 3/1977 |
| DE | 10163292 A1 | 7/2002 |
| DE | 102007058744 A1 | 6/2009 |
| DE | 102005037502 | 11/2009 |
| JP | 3048017 A | 3/1991 |

OTHER PUBLICATIONS

International Search Report PCT/EP2011/054194 mailed on Jul. 6, 2011.

* cited by examiner

*Primary Examiner* — Thomas R Hannon
(74) *Attorney, Agent, or Firm* — Robert L. Stearns; Dickinson Wright, PLLC

(57) ABSTRACT

The invention relates to a semi-annular sliding bearing shell comprising two circumferential end sections (14, 16) and a radial inner face (10) along which a sliding surface (12) lies. Said bearing shell also comprises grooves (18) which are formed on the inner face (10) in the region of at least one of the end sections (14, 16), which run in the circumferential direction, and which are separated in the axial direction. The grooves (18) run inwards on the circumferential end (16, 18) of the sliding bearing shell beginning in the circumferential direction with a decreasing width B and with a decreasing depth T. A groove (18) lies on the exterior of each side in the axial direction, said groove intersecting the corresponding axial edge (24, 26) of the sliding surface.

9 Claims, 2 Drawing Sheets

SLIDING BEARING SHELL

BACKGROUND OF THE INVENTION

1. Technical Field

The invention relates to a semi-circular plain bearing shell with two circumferential end portions, a radial inner side, along which a sliding surface is arranged, and having on the inside in this area on at least one of the end portions, formed, separate grooves that run in the circumferential direction and extend in the axial direction.

2. Related Art

Typical applications for the generic slide bearing shell are the connecting rod or crankshaft main bearings in internal combustion engines. Slide bearing shells of the generic type, for example, are known from German patent application DE 10 2005 037 502 or DE 101 63 292 Al.

Both writings deal with two mutually conflicting problems:

A bearing is formed from two such sliding bearing shells, whose partial surfaces —which are the front-facing end surfaces in the circumferential direction —lie on top of one another. Minor inaccuracies of the assembled bearing result in the partial surfaces being not precisely coordinated, with the result that the inner edge of the partial surface of a bearing shell projects radially inward relative to the inner edge of the adjacent partial surface of the other bearing cup. This hydrodynamic lubrication can be hampered due to this offset, which can lead to additional wear and tear on the bearing. To prevent this, the bearing shells are known to have a so-called exposure on the inner side of its peripheral end portions, where the side 30 of the sliding layer reduces the thickness of the slide bearing shell over the entire axial length. On the one hand, however, these open exposures basically have the disadvantage of collapsing the hydrodynamic oil pressure at this point and, worse still, the lubricating oil can also leak out of the bearing shell in the axial direction at this point, which increases the required oil capacity.

To counter this problem, oil grooves —which are arranged in parallel and immediately adjacent to each other —are provided according to DE 101 63 292 Al in this area where the exposure is usually introduced. These grooves are produced by forming a spiral groove with a groove- spacing corresponding to the drilling tool feed, and with circumferential ridges remaining between the grooves. These ridges are removed due to wear when the bearing shell is being broken in, so that the initial wear forms the exposure itself, and in fact, does this exactly to the extent-that is required in the operating state.

Oil grooves are provided in the other sliding surface areas of the bearing shell, but they have a smaller depth, and thus provide more obtuse ridges that are more resistant to wear. The differently configured oil grooves are formed by drilling the bearing shell, but require different tools and various drilling processes, which increases manufacturing costs.

In patent application DE 10 2005 037 502, it is proposed to arrange the oil grooves in the exposed clear areas that are tilted and oriented in the flow direction of the lubricating oil at the centre line of the bearing shell. The grooves that are oriented in the direction of the lubricating oil's flow, which is predetermined by the direction of rotation of the shaft, run towards the midline, the oil from the edge region of the exposure guided inwards and counteracted in this way an axial oil outflow in the exposure areas.

SUMMARY OF THE INVENTION

The task of the present invention to determine how the exposure counteracts an assembly-related displacement of two bushings, while at the same time achieving a better bearing seal for the axial oil drain.

In a plain bearing shell of the type mentioned and according to the invention, the grooves run at the peripheral end of the plain bearing shell, starting circumferentially, they progress inwardly, with decreasing width and decreasing depth wherein each groove is arranged in the axial direction on both sides on the outside and cuts into the respective edge at the axial end of the sliding surface.

The invention therefore provides no classic exposures, but rather, individual grooves in the circumferential end portions on the inside, between which the sliding surface remains in the circumferential direction up to the part surface. The circumferentially inwardly decreasing width of the grooves reduce the raised portions of the sliding surface (hereinafter also called ridges) in breadth. These ridges therefore provide an increasing resistance to wear in the circumferential direction as viewed inwardly so that the wear that is desired when breaking in the slide bearing shell only occur in the proximity of the partial surfaces, and only to the extent that is needed for compensating for the possible offset of the two slide bearing shells. The remaining ridges are used below to seal and effectively reduce an axial oil outflow.

In contrast to the DE 101 63 292 Al known bearings, the grooves run out in the circumferential direction. The bearing remains a smooth bearing whose wing portion of the inside only continuously decreases in the areas of exposure.

Bearing shells with grooves that terminate at the peripheral end of the slide bearing shell starting inward in the circumferential direction, with decreasing width W and with decreasing depth D, are known from JP 03-048017 AA or DE 25 37 046 Al. The purpose of the grooves indicated there is to ensure oil circulation for a slide bearing shell to the other slide bearing shell pair forming a radial bearing. The grooves shown there however, are not suitable for replacing the exposed areas in the sense described above. This is mainly because no groove is arranged on the outside in the axial direction. It is known that at high loads so-called edge supports, i.e., contacts or peak loads, can occur between the slide bearing and the shaft, in particular in the exposure region, which is due to deformation of the female member that supports the bearing shell, for example, the connecting rod or crankshaft housing, or due to the shaft being misaligned. Due to high acceleration, for example, the connecting rod eye is radially constricted, typically in the vicinity of the surface portions of the assembled bearing shells. The slide bearing shell that is in accordance with the invention that has the grooves lying on the outside on both sides exerts pressure against the edge supports, especially in the area where the greatest amount of deformation or misalignment occurs.

On the other hand, the grooves in JP 03-048017 AA are spaced so far apart that the remaining ridges that remain between them are too massive to be worn down to any appreciable degree when breaking in the slide bearing shell.

One other difference is that the grooves form a macrostructure with significantly broader and deeper grooves. The preferred maximum depth for the grooves on the peripheral end of the slide bearing shell—which would be on the partial or sub surface—is 0.5% to 5%, with the preferred thickness of the bearing shell being 0.5% to 2%.

The preferred maximum width for the grooves on the peripheral end of the slide bearing shell—which is the partial or subsurface area—is from $5^{13}/0$ to 50%, with a preferred bearing shell width of 10% to 25%.

Progressive oil pressure build-up is achieved in the cross-section of the grooves—that decreases from the end portion to the apex of the bearing shell in the circumferential direction.

This represents a considerable improvement over known bearing shells with the exposed area, over which the exposed area passes in the form of an abrupt edge in the adjacent supporting portion of the—sliding surface.

A groove length in the peripheral direction of 1% to 15% is especially preferred, and the preferred peripheral length for the slide bearing shell is 4% to 12%.

It is especially preferred that each of the grooves located on the outside are so arranged in an axial direction that their apex coincides with the edge of the axial end of the slide bearing surface.

One other advantage to the design of this invention is that each of the adjacent grooves make contact with each at the peripheral end of the slide bearing shell.

In other words, this feature can be described as follows: that a raised ridge remains situated between each pair of adjacent grooves, and the surface of the ridge also forms part of the surface of the sliding surface, whereby this surface continues up to the peripheral end (hereafter also referred to as the partial or subsurface), thereby raising the percentage contact surface of the slide bearing surface. However, the percentage contact area between the ridges at the outermost peripheral end, where the grooves—or more specifically, the edges of the grooves come into contact in the cylindrical plane of the sliding surface—decrease to nearly zero. In reality, due to manufacturing tolerances on the outermost peripheral end, one ridge with a small but—nevertheless measurable width is left over. However, this should be included in formulating the grooves that come into contact with each other.

THE DRAWINGS

Other tasks, features and advantages of the invention will be described in greater detail with reference to the figures. In the drawings.

DETAILED DESCRIPTION

Figure 1:
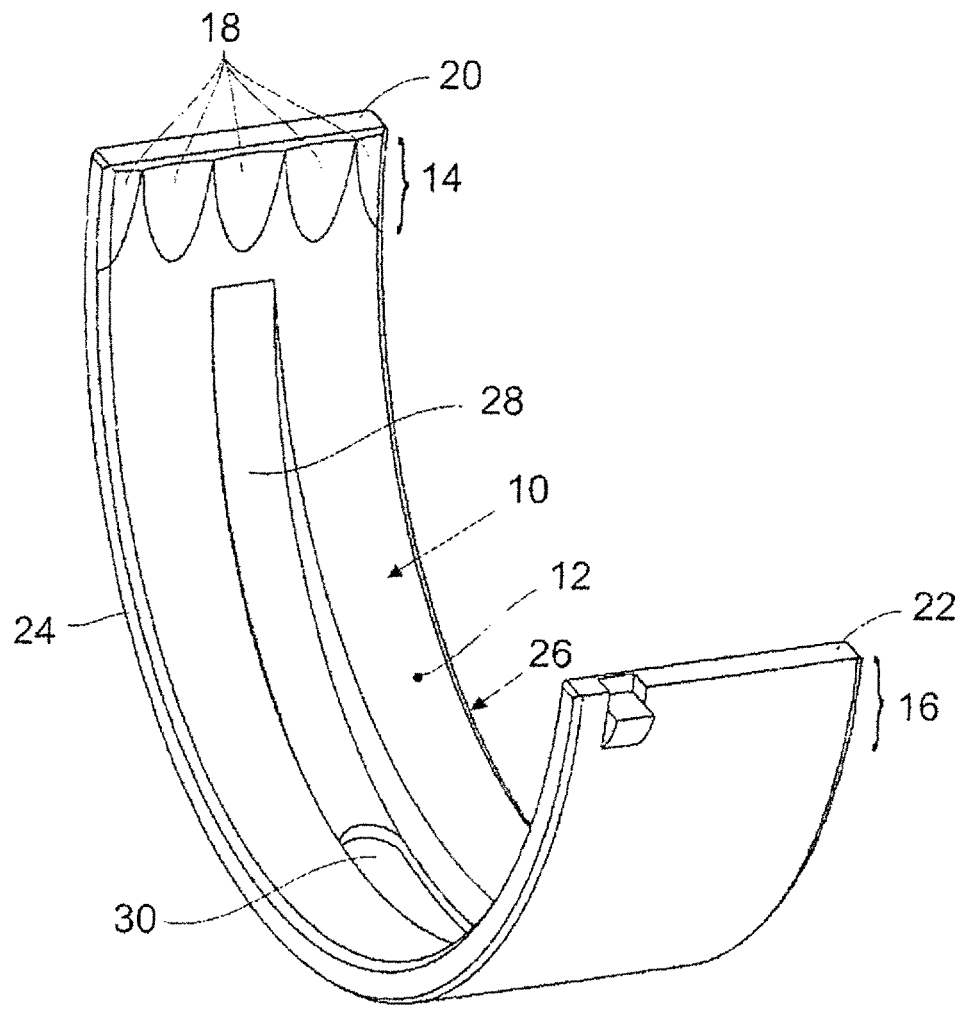
FIG. 1 shows an embodiment of the bearing shell invention in perspective.

The semi-circular plain bearing shell according to FIG. 1 has a radial inner side 10, on which a sliding surface 12 is formed. An oil deposit forms on this sliding surface during operation, and against counter-rotating objects are borne. The plain bearing shell further comprises two circumferential end portions 14 and 16. In the areas of the end portions, 14 and 16 separate grooves are formed that run on the inner side 10 in the circumferential direction and in the axial direction 18, but which can only be identified on the end section here. At its two circumferential ends, each of the plain bearing shell's end face has a partial or subsurface section 20, 22. The slide bearing shell is restricted in the axial direction on both sides by means of an axial end surface or edge 24 or 26.

Two of the semi-circular bearing shells shown in FIG. 1 according to the invention, are assembled to form a radial sliding bearing in that their partial or subsurface areas come into contact with each other and are pressed against each other in the bearing seat.

The inventive slide bearing shell shown in FIG. 1 is further provided with a centrally arranged oil groove 28 that extends in the circumferential direction. This oil groove 28 distributes oil that is supplied through a central oil borehole 30. The oil is first distributed within the oil groove 28 in the circumferential direction and from there it is distributed through the "freerider" or "towing" effect to the sliding surface 10. The oil groove 28 terminates before the circumferential end portions so that no oil is conveyed directly from the oil groove 28 onto the grooves 18 in order to prevent unnecessary oil loss.

Figure 2:
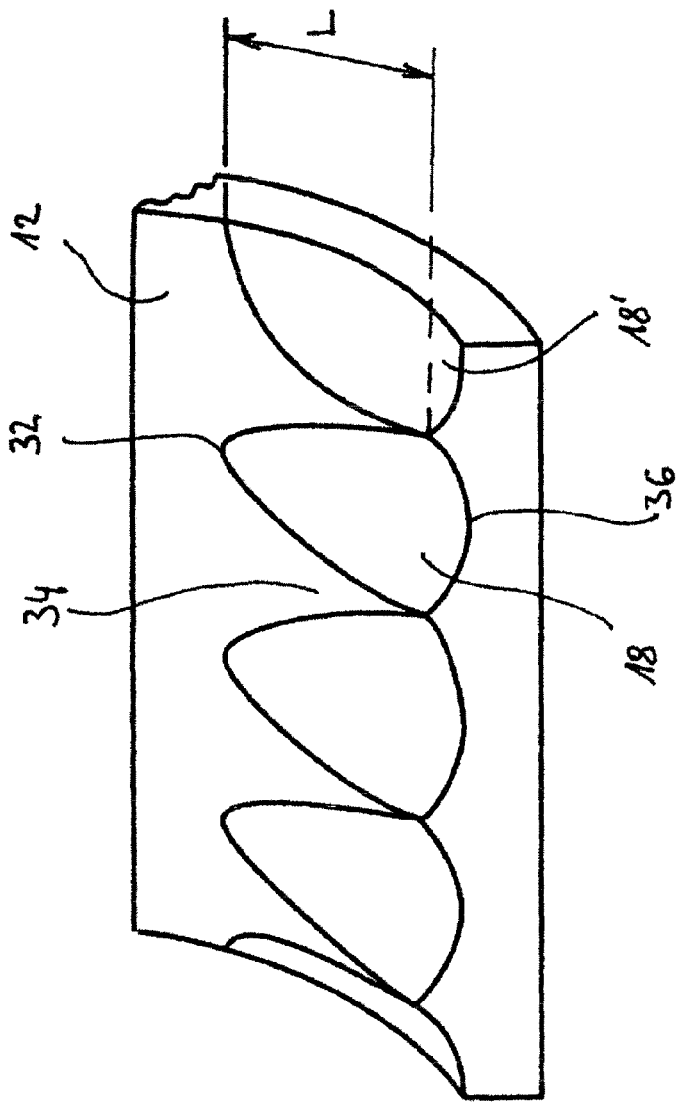
FIG. 2 shows the end section of the slide bearing shell as per FIG. 1 in enlarged perspective and FIG. 3 shows a view of the partial or subsurface of the slide bearing in accordance with the invention.
Figure 3:
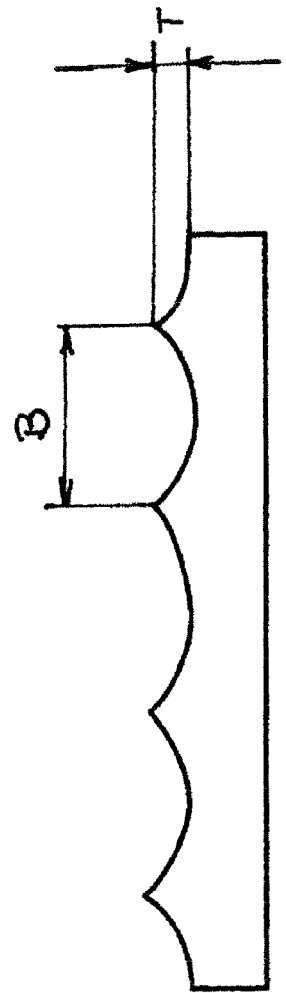

FIGS. 2 and 3 show more clearly that the width and the depth of the grooves 18 in the circumferential direction decrease, starting at the partial or subsurface portion 20, 22 and going in the direction of the centre of the bearing shell until they terminate in a peripheral apex point 32. Length L for the grooves 18 on the partial or subsurface portion 20 or 22 to whose peripheral apex 32 is preferably from 1% to 15%, preferably from 4% to 12% of the peripheral length the entire plain bearing shell.

Between any two adjacent grooves 18, a raised ridge remains 34, whose surface forms part of the sliding surface 12 that continues up to the partial or subsurface portion 22. Overall, with this design, the supporting portion of the sliding surface 12 for the peripheral end portions is increased. But it can also be seen in FIGS. 2 and 3 that the portion of the supporting surface located on the outermost peripheral end of the sliding surface decreases to nearly zero; the grooves are therefore only just still separated and only touch the edges of the grooves on the plane of the sliding surface. This would lead to contact between the sliding surface and the counter-rotating objects in the partial or subsurface area of the slide bearing shell, which deliberate and immediate ridge wear 36 until the reason for the contact—a possible offset of the two assembled plain bearing shells has been compensated, for example. Thus, the need for exposure is taken into account. The ridges 34 simultaneously minimize axial oil drainage.

The groove width W (B) 18 at the peripheral end 20, 22 of the slide bearing shell ranges from 5% to 50%, ranging preferably from 10% to 25% of the slide bearing shell width. Its maximum depth from the sliding surface 12 to the radial apex 36 ranges from 0.5% to 5% at the peripheral end 20, 22, ranging preferably from 0.5% to 2% of the bearing shell thickness.

On benefit of this design in the grooved area is that the oil pressure progressively increases in the circumferential direction of the partial or subsurface portion toward the apex of the bearing shell due to the consistently decreasing groove cross-section, which is beneficial for developing a smooth, even film of oil on the sliding surface.

The exemplary embodiment in FIGS. 1 through 3 shows a total of three complete grooves 18 in the axial direction in the centre of the bearing shell and on both sides of each half groove 18' in the axial direction on the outside. In principle, usually just one groove that is arranged in the centre is enough instead of the three that are shown. There could however, be two, four or more grooves.

The grooves or partial grooves that are arranged outwardly cut into each of the axially arranged edges 24 or 26. This arrangement precludes sliding surface contact near the partial or subsurface with the counter-rotating objects. The known edge support problem is not possible due to a connecting rod constriction, or some other deformation of the shell-bearing female member or skewing of the time. This advantage is ensured in particular if the radial apex 36' of the respective groove oriented outward in the axial direction coincides with the associated axial edge of the sliding surface.

The invention claimed is:

1. A semi-circular slide bearing shell with circumferentially opposed end section, opposite axial edges, a radially inner side along which one sliding surface is arranged, and having a plurality of grooves formed in each of the end sections and extending in the circumferential direction wherein the grooves each have a decreasing width B and with decreasing depth T and wherein two outermost ones of the grooves extend into the axial edges of the bearing shell.

2. The slide bearing shell according to claim 1, wherein a maximum groove depth of the grooves ranges from 0.5% to 5% of the bearing shell thickness.

3. The slide bearing shell according to claim 1, wherein a maximum groove width B of the grooves on the circumferential end of the slide bearing shell ranges from 5% to 50% of the bearing shell thickness.

4. The slide bearing shell according to claim 1, wherein the length L of the grooves in the circumferential direction ranges from 1% to 15% of the circumferential length of the slide bearing shell.

5. The slide bearing shell according to claim 1, wherein the apex of the grooves each face outward and lie in the axial direction and coinciding with an associated axial edge of the sliding surface.

6. The slide bearing shell according to claim 1, wherein each groove makes contact with an adjacent groove on the circumferential end of the slide bearing shell.

7. The slide bearing according of claim 1, wherein a maximum groove depth of the grooves ranges from 0.5% to 2% of the bearing shell thickness.

8. The slide bearing according to claim 1, wherein a maximum groove width of the grooves ranges from 10 to 25% of the bearing shell thickness.

9. The slide bearing according to claim 1, wherein the length L of the grooves ranges from 4-12% of the circumferential length of the slide bearing shell.

* * * * *